US012677277B2

(12) United States Patent
Al-Imari et al.

(10) Patent No.: US 12,677,277 B2
(45) Date of Patent: Jul. 7, 2026

(54) METHOD AND APPARATUS FOR AUTONOMOUS RELIABILITY ENHANCEMENTS IN MOBILE COMMUNICATIONS

(71) Applicant: MediaTek Singapore Pte. Ltd., Singapore (SG)

(72) Inventors: Mohammed S Aleabe Al-Imari, Cambridge (GB); Pradeep Jose, Cambridge (GB); Abdellatif Salah, Cambridge (GB); Mehmet Kunt, Cambridge (GB); Jozsef Gabor Nemeth, Cambridge (GB)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 309 days.

(21) Appl. No.: 18/557,343

(22) PCT Filed: Jul. 20, 2022

(86) PCT No.: PCT/CN2022/106825
§ 371 (c)(1),
(2) Date: Oct. 26, 2023

(87) PCT Pub. No.: WO2023/011190
PCT Pub. Date: Feb. 9, 2023

(65) Prior Publication Data
US 2024/0224266 A1 Jul. 4, 2024

Related U.S. Application Data

(60) Provisional application No. 63/230,123, filed on Aug. 6, 2021.

(51) Int. Cl.
*H04W 72/1268* (2023.01)
*H04L 1/1812* (2023.01)
(Continued)

(52) U.S. Cl.
CPC ....... *H04W 72/1268* (2013.01); *H04L 1/1812* (2013.01); *H04L 5/0012* (2013.01); *H04L 5/0053* (2013.01); *H04W 72/231* (2023.01)

(58) Field of Classification Search
CPC ........... H04W 72/1268; H04W 72/231; H04L 1/1812; H04L 5/0012; H04L 5/0053
See application file for complete search history.

(56) References Cited

U.S. PATENT DOCUMENTS 9,923,674 B2 * 3/2018 You ........................ H04W 72/23
11,696,284 B2 7/2023 Liu et al.
(Continued)

FOREIGN PATENT DOCUMENTS

CN 111886826 A 11/2020
CN 112655266 A 4/2021
(Continued)

OTHER PUBLICATIONS

Nokia et al; "Release 16 NR URLLC Enhancements: Company positions on technical proposals;" 3GPP TSG-RAN#80; RP-180974; Jun. 2018; pp. 1-32 (Year: 2018).*
(Continued)

*Primary Examiner* — Brian J. Gillis
(74) *Attorney, Agent, or Firm* — McClure, Qualey & Rodack, LLP

(57) ABSTRACT

Various solutions for autonomous reliability enhancement with respect to user equipment and network apparatus in mobile communications are described. An apparatus may perform an uplink (UL) transmission on a physical uplink shared channel (PUSCH). The apparatus may receive a feedback corresponding to the UL transmission from a network node on a physical downlink control channel (PDCCH), and the feedback indicates that the UL transmission was not successfully received by the network node. The
(Continued)

200 ⌐ apparatus may apply a reliability enhancement mechanism to subsequent UL transmissions or retransmissions on the PUSCH based on the feedback.

18 Claims, 4 Drawing Sheets

(51) Int. Cl.
 H04L 5/00 (2006.01)
 H04W 72/231 (2023.01)

(56) References Cited

U.S. PATENT DOCUMENTS

| | | | | |
|---|---|---|---|---|
| 12,063,115 | B2 * | 8/2024 | Boström | H04L 1/08 |
| 12,238,033 | B2 * | 2/2025 | MolavianJazi | H04B 7/06952 |
| 2018/0062796 | A1 | 3/2018 | Feng et al. | |
| 2019/0289478 | A1 | 9/2019 | Hosseini et al. | |
| 2019/0306765 | A1 | 10/2019 | Cirik et al. | |
| 2021/0195653 | A1 | 6/2021 | Lei et al. | |
| 2021/0400714 | A1 * | 12/2021 | Huang | H04L 1/1896 |
| 2023/0102706 | A1 * | 3/2023 | Rossbach | H04W 28/0263 |
| | | | | 370/328 |

FOREIGN PATENT DOCUMENTS

| | | | | |
|---|---|---|---|---|
| WO | 2015/114459 | A1 | 8/2015 | |
| WO | WO-2020033785 | A1 * | 2/2020 | ........... H04L 5/0053 |
| WO | 2020/168223 | A1 | 8/2020 | |

OTHER PUBLICATIONS

Extended European Search Report dated 202-03-07, issued in application No. EP 22851904.7.

International Search Report dated Oct. 10, 2022, issued in application No. PCT/CN2022/106825.

Nokia et al; "Release 16 NR URLLC Enhancements: Company positions on technical proposals;" 3GPP TSG-RAN#80; RP-180974; Jun. 2018; pp. 1-32.

Ericsson et al; "URLLC techniques for PUSCH;" 3GPP TSG-RAN WG1 Meeting #92; R1-1802881; Feb. 2018; pp. 1-13.

Chinese language office action dated Feb. 21, 2023, issued in application No. TW 111129439.

Nokia et al.; "[Draft] Summary of Email Discussion [AT113-e][506][IIoT] QoS RAN enhancements (Nokia);" 3GPP TSG-RAN WG2 Meeting #113 Electronic; R2-21xxxxx; Jan. 2021; pp. 1-23.

* cited by examiner

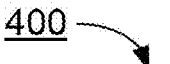

400

┌─────────────────────────────────────────────┐
│  PERFORM, BY A PROCESSOR OF AN APPARATUS, AN │
│  UPLINK (UL) TRANSMISSION ON A PHYSICAL UPLINK │
│       SHARED CHANNEL (PUSCH)                 │
│                410                           │
└─────────────────────────────────────────────┘
                      │
                      ▼
┌─────────────────────────────────────────────┐
│      RECEIVE, BY THE PROCESSOR, A FEEDBACK    │
│  CORRESPONDING TO THE UL TRANSMISSION FROM A  │
│  NETWORK NODE ON A PHYSICAL DOWNLINK CONTROL  │
│   CHANNEL (PDCCH), WHEREIN THE FEEDBACK       │
│   INDICATES THAT THE UL TRANSMISSION WAS NOT  │
│   SUCCESSFULLY RECEIVED BY THE NETWORK NODE   │
│                420                           │
└─────────────────────────────────────────────┘
                      │
                      ▼
┌─────────────────────────────────────────────┐
│     APPLY, BY THE PROCESSOR, A RELIABILITY    │
│   ENHANCEMENT MECHANISM TO SUBSEQUENT UL      │
│  TRANSMISSIONS OR RETRANSMISSIONS ON THE PUSCH │
│          BASED ON THE FEEDBACK               │
│                430                           │
└─────────────────────────────────────────────┘

FIG. 4

METHOD AND APPARATUS FOR AUTONOMOUS RELIABILITY ENHANCEMENTS IN MOBILE COMMUNICATIONS

CROSS REFERENCE TO RELATED PATENT APPLICATION(S)

The present disclosure claims the priority benefit of U.S. Provisional Patent Application No. 63/230,123, filed on 6 Aug. 2021. The contents of aforementioned application are herein incorporated by reference in their entirety.

TECHNICAL FIELD

The present disclosure is generally related to mobile communications and, more particularly, to autonomous reliability enhancements with respect to user equipment and network apparatus in mobile communications.

BACKGROUND

Unless otherwise indicated herein, approaches described in this section are not prior art to the claims listed below and are not admitted as prior art by inclusion in this section.

In $3^{rd}$ Generation Partnership Project (3GPP) Release 17, the 5th Generation (5G) System expands the support for time sensitive communications (TSC) for any application, e.g., Industrial Internet of Things (IIoT) applications. In TSC, the traffic pattern typically requires tight requirements on ultra-reliability and low latency for industrial communication to support use cases, such as discrete automation, process automation, and intelligent transport systems. 3GPP has introduced the survival time as a new service parameter in 5G, which allows an application consuming a communication service to continue (or say survive) for a period of time without receiving an anticipated message. Once the application on the target device detects the absence of an anticipated message, it will wait for the period of time indicated by the survival time before it considers the communication service to be unavailable.

Accordingly, how to avoid consecutive packet failures that lead to violating the survival time becomes an important issue for the newly developed wireless communication network. Given the short time duration between consecutive packets in IIoT applications, there is no sufficient time to modify the radio resource control (RRC) parameters (i.e., RRC re-configuration) to enhance the transmission reliability. Therefore, it is needed to provide autonomous reliability enhancement mechanisms that can be triggered once a packet failure has been detected.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to autonomous reliability enhancements with respect to user equipment and network apparatus in mobile communications.

In one aspect, a method may involve an apparatus performing an uplink (UL) transmission on a physical uplink shared channel (PUSCH). The method may also involve the apparatus receiving a feedback corresponding to the UL transmission from a network node on a physical downlink control channel (PDCCH), wherein the feedback indicates that the UL transmission was not successfully received by the network node. The method may further involve the apparatus applying a reliability enhancement mechanism to subsequent UL transmissions or retransmissions on the PUSCH based on the feedback.

In one aspect, an apparatus may comprise a transceiver which, during operation, wirelessly communicates with at least one network node of a wireless network. The apparatus may also comprise a processor communicatively coupled to the transceiver. The processor, during operation, may perform operations comprising performing, via the transceiver, an UL transmission on a PUSCH. The processor may also perform operations comprising receiving, via the transceiver, a feedback corresponding to the UL transmission from the network node on a PDCCH, wherein the feedback indicates that the UL transmission was not successfully received by the network node. The processor may further perform operations comprising applying a reliability enhancement mechanism to subsequent UL transmissions or retransmissions on the PUSCH based on the feedback.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT), Narrow Band Internet of Things (NB-IoT) and Industrial Internet of Things (IIoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 4 is a flowchart of an example process in accordance with an implementation of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to autonomous retransmissions on configured grants with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

Figure 1:
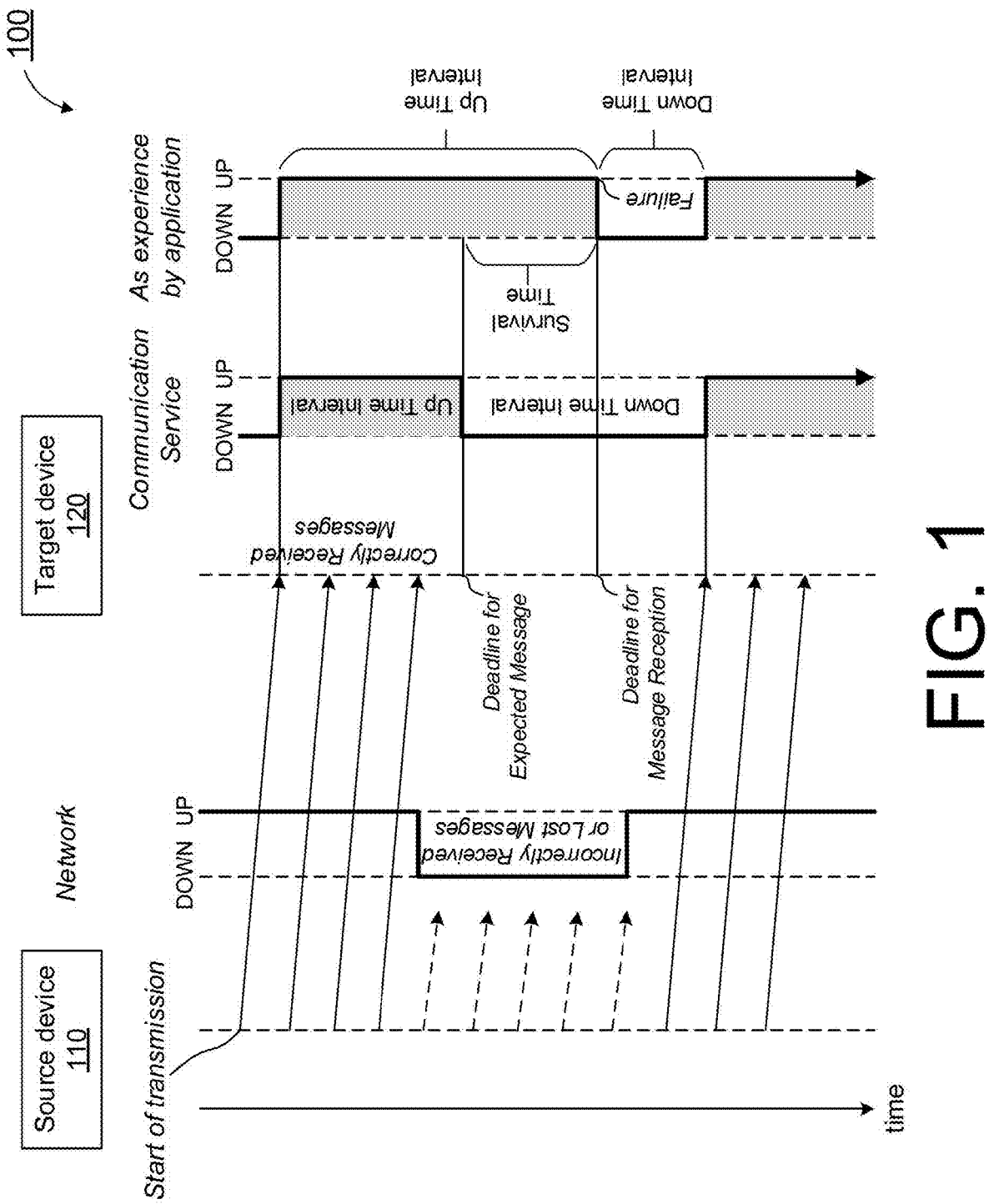
FIG. 1 illustrates an example scenario of survival time, communication service status, and application layer experience in accordance with current NR framework.

In current NR framework, TSC applications, such as IIoT applications, which require tight requirements on ultra-reliability and low latency for industrial communication, are supported to cover various use cases, including discrete automation, process automation, and intelligent transport systems. In particular, survival time has been introduced as a new service parameter in 5G, which allows an application consuming a communication service to continue (or say survive) for a period of time without receiving an anticipated message. FIG. 1 illustrates an example scenario 100 of survival time, communication service status, and application layer experience in accordance with current NR framework. Scenario 100 involves a source device 110 (e.g., a network node of a 5G NR network) and a target device 120 (e.g., a UE). Once the application on the target device 120 detects the absence of an anticipated message, it will wait for the period of time indicated by the survival time before it considers the communication service to be unavailable. Accordingly, how to avoid consecutive packet failures that lead to violating the survival time becomes an important issue for the newly developed wireless communication network. Given the short time duration between consecutive packets in IIoT applications, there is no sufficient time to modify the RRC parameters (i.e., RRC re-configuration) to enhance the transmission reliability. Therefore, it is needed to provide autonomous reliability enhancement mechanisms that can be triggered once a packet failure has been detected.

In view of the above, the present disclosure proposes a number of schemes pertaining to autonomous reliability enhancements with respect to the UE and network apparatus in mobile communications. According to the schemes of the present disclosure, reliability enhancement mechanisms at a user equipment (UE) can be triggered once a packet failure has been detected. The UE may perform an UL transmission on the PUSCH, and when a feedback indicating that the UL transmission was not successfully received by a network node is received on the PDCCH, and the UE may apply the proposed reliability enhancement mechanism(s) to subsequent UL transmissions or retransmissions on the PUSCH, so as to avoid the survival time from being exceeded. More specifically, the feedback may comprise a grant for an UL retransmission or may comprise a NACK corresponding to the UL transmission. In addition, the reliability enhancement mechanism(s) may be applied only to configured-grant PUSCH (CG-PUSCH) transmissions which are scheduled and addressed by the Configured Scheduling-Radio Network Temporary Identifier (CS-RNTI). Accordingly, by applying the schemes of the present disclosure, the situation where consecutive packet failures lead to violating the survival time can be avoided, and the transmission reliability can be improved. TSC applications (e.g., IIoT applications) which require tight requirements on ultra-reliability and low latency for industrial communication can benefit from the enhancements achieved by the implementations of the present disclosure.

Figure 2:
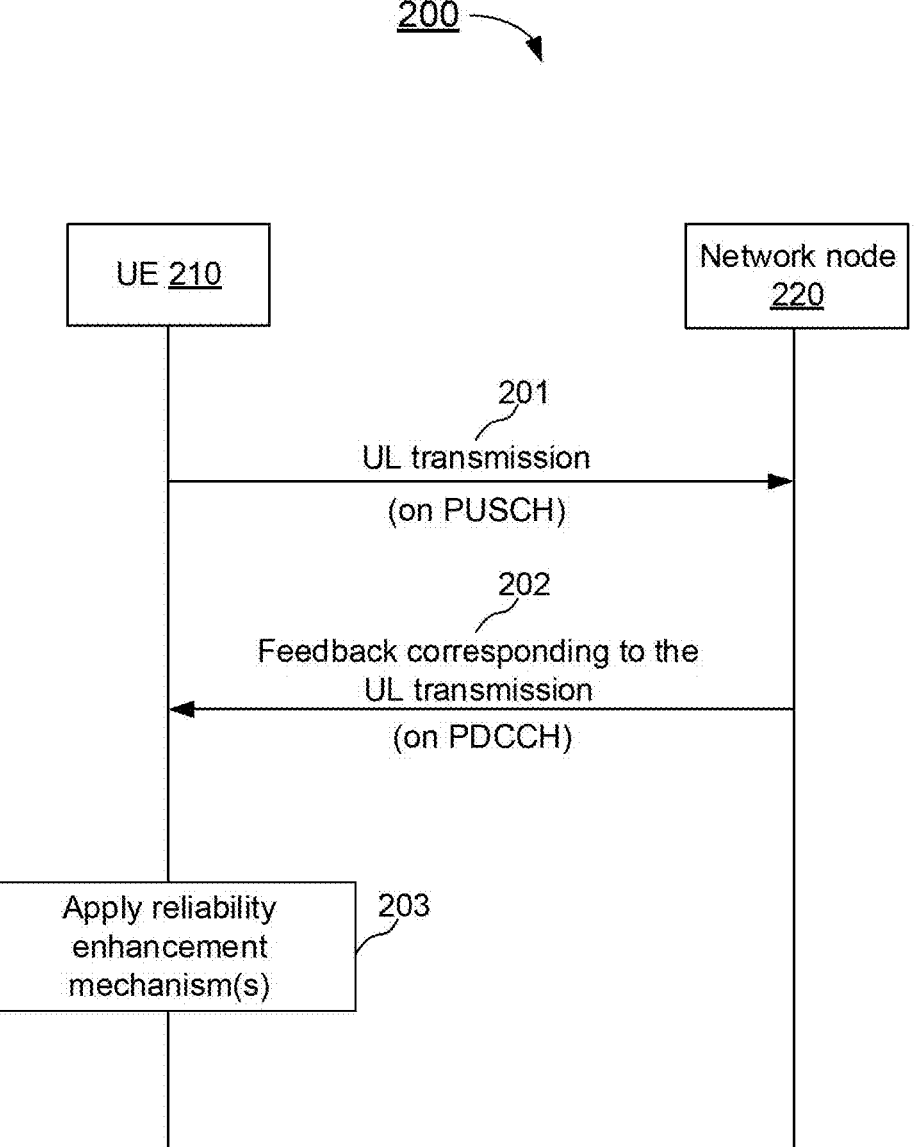
FIG. 2 illustrates an example scenario under schemes in accordance with implementations of the present disclosure.

FIG. 2 illustrates an example scenario 200 under schemes in accordance with implementations of the present disclosure. Scenario 200 involves a UE 210 and a network node 220 which may be a part of a wireless communication network (e.g., an LTE network, a 5G network, an NR network, an IoT network or an NB-IoT network). Scenario 200 illustrates an exemplary sequence flow between the UE 210 and the network node 220 for enabling autonomous reliability enhancement(s) in mobile communications. In step 201, the UE 210 performs an UL transmission on the PUSCH. In step 202, the UE 220 receives a feedback on the PDCCH, which indicates that the UL transmission was not successfully received by the network node 220. In step 203, the UE 220 applies one or more reliability enhancement mechanism(s) to subsequent UL (re)transmissions on the PUSCH.

In some implementations, the feedback received on the PDCCH may comprise a grant for an UL retransmission.

In some implementations, the feedback received on the PDCCH may comprise a NACK (e.g., a hybrid automatic repeat request (HARQ) NACK) corresponding to the UL transmission.

In some implementations, the feedback received on the PDCCH may comprise a downlink control information (DCI). For example, an existing DCI field may be reused to carry the feedback. Alternatively, a new specific DCI field may be introduced to carry the feedback.

In some implementations, the reliability enhancement mechanism(s) may be applied to a specific type of PUSCH transmissions (e.g., based on high layer parameter(s)). For example, the reliability enhancement mechanism(s) may be applied only to CG-PUSCH transmissions. Alternatively, the reliability enhancement mechanism(s) may be applied only to dynamic-grant PUSCH (DG-PUSCH) transmissions.

In some implementations, the reliability enhancement mechanism(s) may be applied to PUSCH transmissions with a specific priority. For example, the reliability enhancement mechanism(s) may be applied only to PUSCH transmissions with a high priority (HP) (or called HP-PUSCH transmissions). Alternatively, the reliability enhancement mechanism(s) may be applied only to PUSCH transmissions with a low priority (LP) (or called LP-PUSCH transmissions).

In some implementations, the reliability enhancement mechanism(s) may comprise at least one of the following: applying PUSCH repetition in the time domain and/or the frequency domain; applying PUSCH frequency hopping; applying the PUSCH repetition with the PUSCH frequency hopping; and applying multi-transmission and reception point (multi-TRP) PUSCH repetition.

In some implementations, the number of repetitions is configured for the PUSCH repetition, the PUSCH frequency hopping, the PUSCH repetition with the PUSCH frequency hopping, or the multi-TRP PUSCH repetition by one or more high layer parameters. Alternatively, the number of repetitions may be increased if more UL transmission failures occur. For example, the UE may apply X repetitions based on the initial UL transmission failure and then increase it to Y repetitions when UL transmission failure occurs again.

In some implementations, the reliability enhancement mechanism(s) may be applied for a period of time (e.g., based on a configured timer), or may be applied until an indication is received via a DCI, a HARQ NACK or a media access control (MAC) control element (MAC CE), or may be applied until another reliability enhancement mechanism is applied (e.g., until the packet duplication (i.e., packet data convergence protocol (PDCP) duplication) function is activated or deactivated).

Illustrative Implementations

Figure 3:
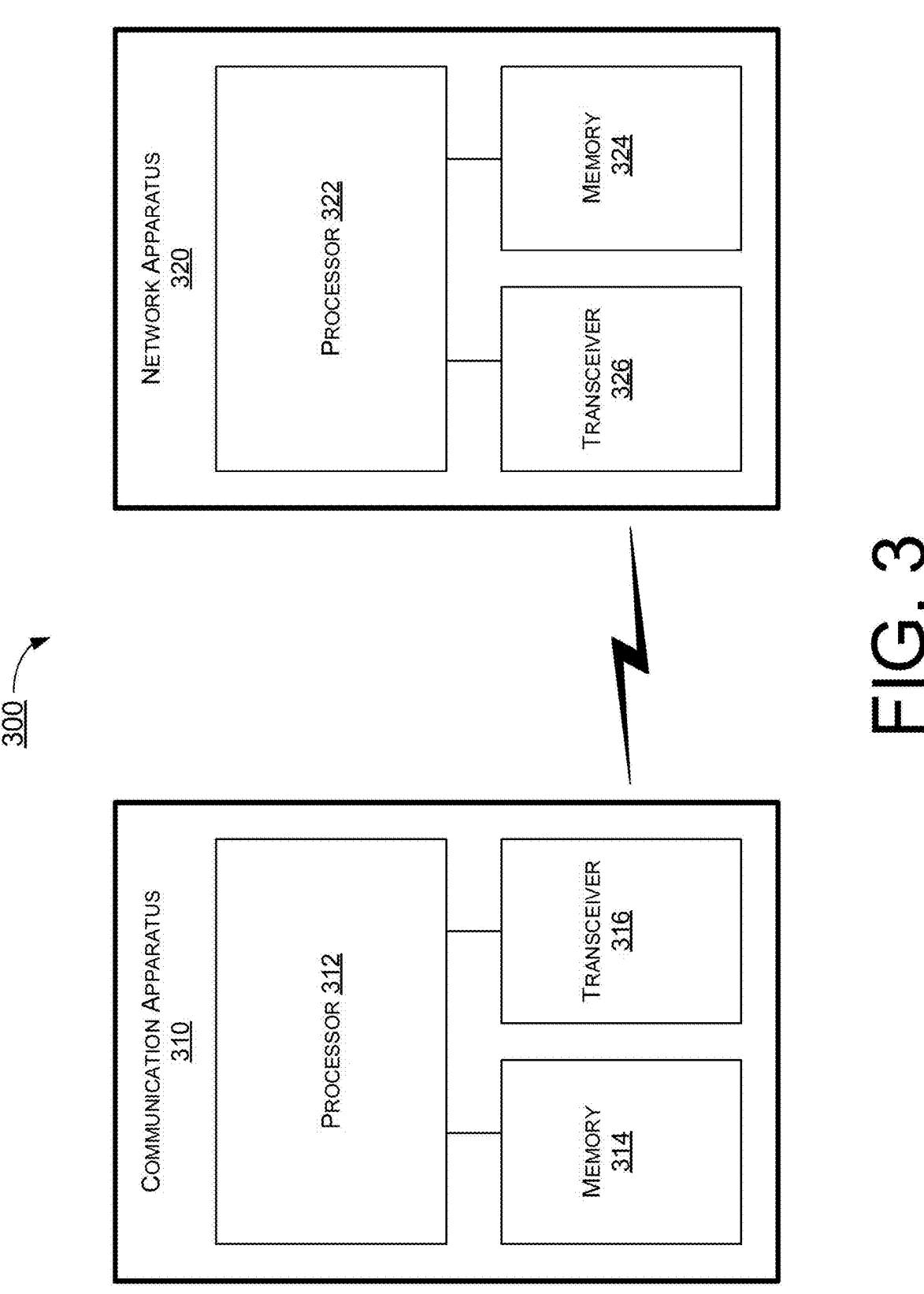
FIG. 3 is a block diagram of an example communication system in accordance with an implementation of the present disclosure.

FIG. 3 illustrates an example communication system 300 having an example communication apparatus 310 and an example network apparatus 320 in accordance with an implementation of the present disclosure. Each of communication apparatus 310 and network apparatus 320 may perform various functions to implement schemes, techniques, processes and methods described herein pertaining to autonomous reliability enhancements with respect to user equipment and network apparatus in mobile communications, including scenarios/schemes described above as well as process 400 described below.

Communication apparatus 310 may be a part of an electronic apparatus, which may be a UE such as a portable or mobile apparatus, a wearable apparatus, a wireless communication apparatus or a computing apparatus. For instance, communication apparatus 310 may be implemented in a smartphone, a smartwatch, a personal digital assistant, a digital camera, or a computing equipment such as a tablet computer, a laptop computer or a notebook computer. Communication apparatus 310 may also be a part of a machine type apparatus, which may be an IoT, NB-IoT, or IIoT apparatus such as an immobile or a stationary apparatus, a home apparatus, a wire communication apparatus or a computing apparatus. For instance, communication apparatus 310 may be implemented in a smart thermostat, a smart fridge, a smart door lock, a wireless speaker or a home control center. Alternatively, communication apparatus 310 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 310 may include at least some of those components shown in FIG. 3 such as a processor 312, for example. Communication apparatus 210 may further include one or more other components not pertinent to the proposed scheme of the present disclosure (e.g., internal power supply, display device and/or user interface device), and, thus, such component(s) of communication apparatus 310 are neither shown in FIG. 3 nor described below in the interest of simplicity and brevity.

Network apparatus 320 may be a part of an electronic apparatus, which may be a network node such as a base station, a small cell, a router or a gateway. For instance, network apparatus 320 may be implemented in an eNodeB in an LTE, LTE-Advanced or LTE-Advanced Pro network or in a gNB in a 5G, NR, IoT, NB-IoT or IIoT network.

Alternatively, network apparatus 320 may be implemented in the form of one or more IC chips such as, for example and without limitation, one or more single-core processors, one or more multi-core processors, or one or more RISC or CISC processors. Network apparatus 320 may include at least some of those components shown in FIG. 3 such as a processor 322, for example. Network apparatus 320 may further include one or more other components not pertinent to the proposed scheme of the present disclosure (e.g., internal power supply, display device and/or user interface device), and, thus, such component(s) of network apparatus 320 are neither shown in FIG. 3 nor described below in the interest of simplicity and brevity.

In one aspect, each of processor 312 and processor 322 may be implemented in the form of one or more single-core processors, one or more multi-core processors, or one or more CISC processors. That is, even though a singular term "a processor" is used herein to refer to processor 312 and processor 322, each of processor 312 and processor 322 may include multiple processors in some implementations and a single processor in other implementations in accordance with the present disclosure. In another aspect, each of processor 312 and processor 322 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 312 and processor 322 is a special-purpose machine specifically designed, arranged and configured to perform specific tasks including autonomous reliability enhancements in a device (e.g., as represented by communication apparatus 310) and a network (e.g., as represented by network apparatus 320) in accordance with various implementations of the present disclosure.

In some implementations, communication apparatus 310 may also include a transceiver 316 coupled to processor 312 and capable of wirelessly transmitting and receiving data. In some implementations, communication apparatus 310 may further include a memory 314 coupled to processor 312 and capable of being accessed by processor 312 and storing data therein. In some implementations, network apparatus 320 may also include a transceiver 326 coupled to processor 322 and capable of wirelessly transmitting and receiving data. In some implementations, network apparatus 320 may further include a memory 324 coupled to processor 322 and capable of being accessed by processor 322 and storing data therein. Accordingly, communication apparatus 310 and network apparatus 320 may wirelessly communicate with each other via transceiver 316 and transceiver 326, respectively. To aid better understanding, the following description of the operations, functionalities and capabilities of each of communication apparatus 310 and network apparatus 320 is provided in the context of a mobile communication environment in which communication apparatus 310 is implemented in or as a communication apparatus or a UE and network apparatus 320 is implemented in or as a network node of a communication network.

In some implementations, processor 312 may perform, via transceiver 316, an UL transmission on the PUSCH. Then, processor 212 may receive, via transceiver 316, a feedback corresponding to the UL transmission from the network apparatus 320 on the PDCCH, wherein the feedback indicates that the UL transmission was not successfully received by the network apparatus 320. After that, processor 312 may apply a reliability enhancement mechanism to subsequent UL transmissions or retransmissions on the PUSCH based on the feedback. More specifically, applying the reliability enhancement mechanism based on the feedback may comprise applying the reliability enhancement mechanism in response to the reception of the feedback (e.g., when/upon receiving the feedback).

Illustrative Processes

FIG. 4 illustrates an example process 400 in accordance with an implementation of the present disclosure. Process 400 may be an example implementation of above scenarios/schemes, whether partially or completely, with respect to autonomous reliability enhancements with the present disclosure. Process 400 may represent an aspect of implementation of features of communication apparatus 310. Process 400 may include one or more operations, actions, or functions as illustrated by one or more of blocks 410, 420, 430, 440, 450, and 460. Although illustrated as discrete blocks, various blocks of process 400 may be divided into additional blocks, combined into fewer blocks, or eliminated, depending on the desired implementation. Moreover, the blocks of process 400 may executed in the order shown in FIG. 4 or, alternatively, in a different order. Process 400 may be implemented by communication apparatus 310 or any suitable UE or machine type devices. Solely for illustrative purposes and without limitation, process 400 is described below in the context of communication apparatus 410. Process 400 may begin at block 410.

At 410, process 400 may involve processor 312 of apparatus 310 performing, via transceiver 316, an UL transmission on a PUSCH. Process 400 may proceed from 410 to 420.

At 420, process 400 may involve processor 312 receiving, via transceiver 316, a feedback corresponding to the UL transmission from a network node on a PDCCH, wherein the feedback indicates that the UL transmission was not successfully received by the network node. Process 400 may proceed from 420 to 430.

At 430, process 400 may involve processor 312 applying a reliability enhancement mechanism to subsequent UL transmissions or retransmissions on the PUSCH based on the feedback.

In some implementations, the feedback may comprise a grant for an UL retransmission.

In some implementations, the first timer is not restarted when the second timer is expired.

In some implementations, the feedback may comprise a NACK corresponding to the UL transmission.

In some implementations, the feedback may comprise a DCI.

In some implementations, the reliability enhancement mechanism may be applied only to CG-PUSCH transmissions.

In some implementations, the reliability enhancement mechanism may be applied only to PUSCH transmissions with a high priority.

In some implementations, applying the reliability enhancement mechanism may comprise one of the following: applying PUSCH repetition in at least one of a time domain and a frequency domain; applying PUSCH frequency hopping; applying the PUSCH repetition with the PUSCH frequency hopping; and applying multi-TRP PUSCH repetition.

In some implementations, a number of repetitions may be configured for the PUSCH repetition, the PUSCH frequency hopping, the PUSCH repetition with the PUSCH frequency hopping, or the multi-TRP PUSCH repetition by one or more high layer parameters.

In some implementations, the reliability enhancement mechanism may be applied for a period of time or may be applied until an indication is received via a DCI, a HARQ NACK or a MAC CE, or may be applied until a packet duplication function is activated or deactivated.

In some implementations, the reliability enhancement mechanism may be applied to avoid a survival time from being exceeded, wherein the survival time indicates a maximum time period that an application consuming a communication service is allowed to continue without receiving an anticipated message.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
performing, by a processor of an apparatus, an uplink (UL) transmission on a physical uplink shared channel (PUSCH);
receiving, by the processor, a feedback corresponding to the UL transmission from a network node on a physical downlink control channel (PDCCH), wherein the feedback indicates that the UL transmission was not successfully received by the network node; and
applying, by the processor, a reliability enhancement mechanism to subsequent UL transmissions or retransmissions on the PUSCH based on the feedback, wherein the reliability enhancement mechanism is applied only to configured-grant PUSCH (CG-PUSCH) transmissions.

2. The method of claim 1, wherein the feedback comprises a grant for an UL retransmission.

3. The method of claim 1, wherein the feedback comprises a negative acknowledgement (NACK) corresponding to the UL transmission.

4. The method of claim 1, wherein the feedback comprises a downlink control information (DCI).

5. The method of claim 1, wherein the reliability enhancement mechanism is applied only to PUSCH transmissions with a high priority.

6. The method of claim 1, wherein applying the reliability enhancement mechanism comprises at least one of the following:
applying PUSCH repetition in at least one of a time domain and a frequency domain;
applying PUSCH frequency hopping;
applying the PUSCH repetition with the PUSCH frequency hopping; and
applying multi-transmission and reception point (multi-TRP) PUSCH repetition.

7. The method of claim 6, wherein a number of repetitions is configured for the PUSCH repetition, the PUSCH frequency hopping, the PUSCH repetition with the PUSCH frequency hopping, or the multi-TRP PUSCH repetition by one or more high layer parameters.

8. The method of claim 1, wherein the reliability enhancement mechanism is applied for a period of time or is applied until an indication is received via a downlink control information (DCI), a hybrid automatic repeat request (HARQ) NACK or a media access control (MAC) control element (MAC CE) or is applied until a packet duplication function is activated or deactivated.

9. The method of claim 1, wherein the reliability enhancement mechanism is applied to avoid a survival time from being exceeded, and wherein the survival time indicates a maximum time period that an application consuming a communication service is allowed to continue without receiving an anticipated message.

10. An apparatus, comprising:
a transceiver which, during operation, wirelessly communicates with at least one network node of a wireless network; and
a processor communicatively coupled to the transceiver such that, during operation, the processor performs operations comprising:
performing, via the transceiver, an uplink (UL) transmission on a physical uplink shared channel (PUSCH);
receiving, via the transceiver, a feedback corresponding to the UL transmission from the network node on a physical downlink control channel (PDCCH), wherein the feedback indicates that the UL transmission was not successfully received by the network node; and
applying a reliability enhancement mechanism to subsequent UL transmissions or retransmissions on the PUSCH based on the feedback, wherein the reliability enhancement mechanism is applied only to configured-grant PUSCH (CG-PUSCH) transmissions.

11. The apparatus of claim 10, wherein the feedback comprises a grant for an UL retransmission.

12. The apparatus of claim 10, wherein the feedback comprises a negative acknowledgement (NACK) corresponding to the UL transmission.

13. The apparatus of claim 10, wherein the feedback comprises a downlink control information (DCI).

14. The apparatus of claim 10, wherein the reliability enhancement mechanism is applied only to PUSCH transmissions with a high priority.

15. The apparatus of claim 10, wherein applying the reliability enhancement mechanism comprises at least one of the following:
applying PUSCH repetition in at least one of a time domain and a frequency domain;
applying PUSCH frequency hopping;
applying the PUSCH repetition with the PUSCH frequency hopping; and
applying multi-Transmission and Reception Point (multi-TRP) PUSCH repetition.

16. The apparatus of claim 15, wherein a number of repetitions is configured for the PUSCH repetition, the PUSCH frequency hopping, the PUSCH repetition with the PUSCH frequency hopping, or the multi-TRP PUSCH repetition by one or more high layer parameters.

17. The apparatus of claim 10, wherein the reliability enhancement mechanism is applied for a period of time or is applied until an indication is received via a downlink control information (DCI), a hybrid automatic repeat request (HARQ) NACK or a media access control (MAC) control element (MAC CE) or is applied until a packet duplication function is activated or deactivated.

18. The apparatus of claim 10, wherein the reliability enhancement mechanism is applied to avoid a survival time from being exceeded, and wherein the survival time indicates a maximum time period that an application consuming a communication service is allowed to continue without receiving an anticipated message.

* * * * *